United States Patent Office 3,169,945
Patented Feb. 16, 1965

3,169,945
LACTONE POLYESTERS
Fritz Hostettler, Charleston, W. Va., and Donald M. Young, New York, N.Y., assignors to Union Carbide Corporation, a corporation of New York
No Drawing. Filed Oct. 7, 1963, Ser. No. 314,485
38 Claims. (Cl. 260—78.3)

The present invention relates to lactone polyesters that are useful as plasticizers and as intermediates for preparing elastomers and foams, and to resins plasticized with such polyesters.

This application is a continuation-in-part of application Serial No. 577,950, entitled "Lactone Polyesters" by D. M. Young and F. Hostettler, filed April 13, 1956, now abandoned, said latter application being assigned to the same assignee as the instant application.

We have discovered that lactones can be polymerized in the presence or in the absence of an ester interchange catalyst to form polyesters of widely varying and readily controllable molecular weight. The polyesters so obtained are characterized by the presence of recurring lactone residues and, initially at least, by one or more terminal hydroxyl groups. They have outstanding utility as intermediates for reaction with diisocyanates in the preparation of elastomers and foams, particularly if at least a substantial proportion of the lactone residues are substituted, and are also eminently useful as plasticizers for vinyl halide and other resins.

The lactone polyesters with which this invention is concerned include polyesters of individual unsubstituted and substituted lactones, copolyesters of different substituted lactones and copolyesters of substituted and unsubstituted lactones, as well as blends thereof.

The lactone used as a starting material may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

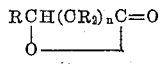

in which $n$ is a least four, for example, from four to six, at least $n+2$ R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

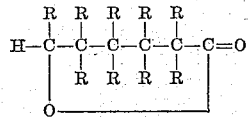

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not distributed; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-carprolactones.

Lactones having more than six carbon atoms in the ring, e.g., zeta-enatholactone and eta-caprylolactone may also be polymerized in accordance with the method of the invention.

The various lactones may be utilized individually or in combination. When the lactone polyesters prepared in accordance with the invention are intended to be used as intermediates for reaction with diisocyanates in the preparation of polyurethanes, it is generally preferred to utilize mixtures of substituted and unsubstituted lactones in order to achieve optimum non-hardening characteristics. If on the other hand the lactone polyesters are to be employed as plasticizers, optimum results are obtainable with polyesters derived from monomethyl substituted lactones and with copolyesters derived from unsubstituted and monomethyl substituted lactones. Generally, however, the choice of initial lactone or combinations of lactones is practically unlimited except, in so far as is pointed out with reference to the tendency of highly substituted lactones to revert to monomeric forms, particularly at higher temperatures.

Polymerization of the lactone in accordance with the method of the invention is initiated by reaction with one or more compounds having at least one reactive hydrogen capable, with or without the aid of a catalyst, of opening the lactone ring and adding it as an open chain without forming water of condensation. Compounds that are suitable for initiating the polymerization, and therefore referred to herein as initiators, include monofunctional initiators such as alcohols and amines, and polyfunctional initiators such as polyols, polyamines, amino alcohols, and vinyl polymers, as well as amides, sulfonamides, hydrozones, semicarbazones, oximes, polycarboxylic acids, hydroxy carboxylic acids and aminocarboxylic acids.

Alcohols that are useful as monofunctional initiators include primary, secondary, and tertiary aliphatic alcohols such as methanol, ethanol, propanol, isopropanol, 1-butanol, 2-butanol, tert-butanol, 1-pentanol, 3-pentanol, tert-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol.

Amines that are useful as monofunctional initiators include primary and secondary aliphatic amines such as methyl, ethyl, n-propyl, isopropyl, n-butyl, sec-butyl, isobutyl, tert-butyl, n-amyl, n-hexyl and 2-ethylhexylamine, as well as the corresponding dialkyl amines; aromatic amines such as aniline, ortho-toluidine, meta-toluidine, and diphenylamine; cyclo-aliphatic amines such as cyclohexyl- and dicyclohexylamine; and heterocyclic amines such as pyrrolidine, piperidine, and morpholine.

Diols that are suitable as bifunctional initiators include glycols of the formula $HO(CH_2)_nOH$ in which $n$ equals 2 to 10, glycols of the formulae $HO(CH_2CH_2O)_nH$ and $HO[CH(CH_3)CH_2O]_nH$ in which $n$ equals 1 to 40, such as ethylene glycol, diethylene glycol, and the like, 2,2-dimethyl-1,3-propanediol, 2,2-diethyl-1,3-propanediol, 3-methyl-1,5-pentanediol, N-methyl and N-ethyl diethanolamines, various cyclohexanediols,

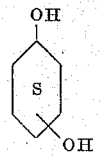

4,4'-methylenebiscyclohexanol,

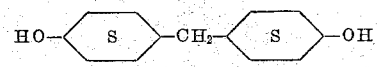

4,4'-isopropylidenebiscyclohexanol,

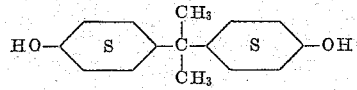

various xylenediols,

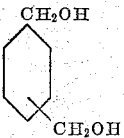

various hydroxymethyl-phenethyl alcohols,

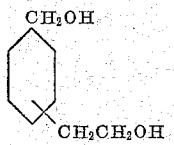

various hydroxymethyl-phenylpropanols,

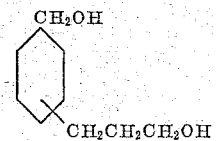

various phenylenediethanols,

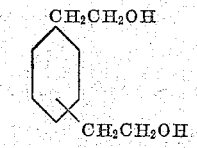

various phenylenedipropanols,

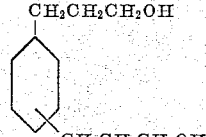

and various heterocyclic diols such as 1,4-piperazinediethanol.

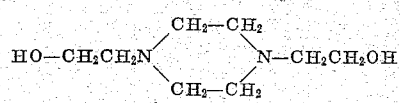

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamide, or carboxyl groups. They are obtainable by reacting diols of the class $HO(CH_2)_nOH$, where $n$ equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorous acid; aliphatic, aromatic, and cycloaliphatic primary monoamines, like methylamine, ethylamine, propylamine, butylamine, aniline, cyclohexylamine; secondary diamines, like N,N'-dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

The preparation of the polyoxyalkylated derivatives suitable for the purposes of the invention is illustrated by the reaction of 1,4-butanediol with ethylene oxide:

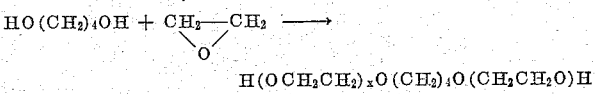

where $x+y=1$ to 40.

Other useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides, or anhydrides of inorganic and organic acids; and inorganic acids or anhydrides thereof whose anions show little tendency to polarize. Polymers containing hydroxyl end groups can be obtained by treating these products with alkaline reagents upon completion of the polymerization reaction. Among suitable monoepoxides for preparing such polymers are tetrahydrofuran, trimethylene oxide, propylene oxide, ethylene oxide and mixtures thereof.

Higher functional alcohols suitable for initiating the polymerization of lactones in accordance with the method of the invention include triols such as glycerol, trimethylolpropane, 1,2,4-butanetriol, 1,2,6-hexanetriol, triethanolamine, and triisopropanolamine; various tetrols like erythritol, pentaerythritol, N,N,N',N'-tetrakis(2-hydroxyethyl)ethylenediamine,

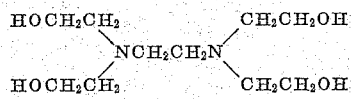

and N,N,N',N'-tetrakis(2-hydroxypropyl)ethylenediamine;

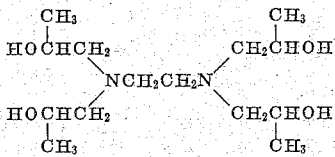

pentols; hexols like dipentaerythritol and sorbitol; alkyl glycosides; and carbohydrates such as glucose, sucrose, starch, and cellulose.

Also suitable as polyols are the polyoxyalkylated derivatives of polyfunctional compounds having three or more reactive hydrogen atoms as, for example, the reaction product of trimethylolpropane with ethylene oxide in accordance with the reaction:

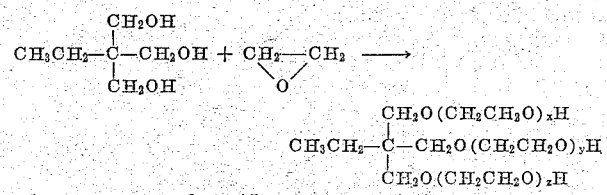

where $x+y+z=3$ to 45.

In addition to the polyoxyalkylated derivatives of trimethylolpropane, those of the following compounds are likewise suitable: glycerol, 1,2,4-butanetriol, 1,2,6-hexanetriol, erythritol, pentaerythritol, sorbitol, methyl glycosides, glucose, sucrose, diamines of the general formula $H_2N(CH_2)_nNH_2$, where $n$ equals 2 to 10, 2-(methylamino)ethylamine, various phenylene- and toluene-diamines, benzidine, 3,3'-dimethyl-4,4'-biphenyldiamine, 4,4'-methylenedianiline, 4,4',4''-methylidynetrianiline, cycloaliphatic diamines, like 2,4-cyclohexanediamine and 1-methyl-2,4-cyclohexanediamine, amino alcohols of the general formula $HO(CH_2)_nNH_2$, where $n$ equals 2 to 10, diethylenetriamine, triethylenetetramine, tetraethylenepentamine, poly-carboxylic acids like citric acid, aconitic acid,

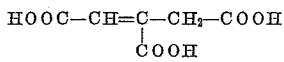

mellitic acid,

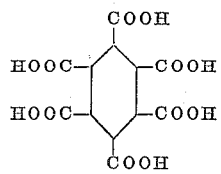

and pyromellitic acid,

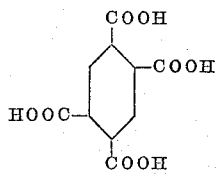

and polyfunctional inorganic acids like phosphoric acid.

Difunctional amino alcohols capable of initiating the polymerization of lactones include aliphatic amino alcohols of the general formula $HO(CH_2)_nNH_2$, where $n$ equals 2 to 10,
N-methylethanolamine,

isopropanolamine,

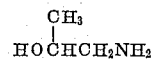

N-methylisopropanolamine,

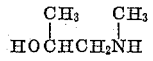

aromatic amino alcohols like para-amino-phenethyl alcohol,

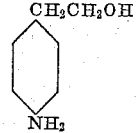

and para-amino-alpha-methylbenzyl alcohol,

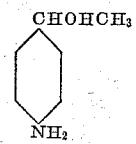

and various cycloaliphatic amino alcohols like 4-aminocyclohexanol.

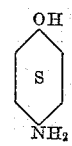

Higher functional amino alcohols having a total of at least three hydroxy and primary or secondary amino groups that are suitable in the method of the invention include diethanolamine, diisopropanolamine, 2-(2-aminoethylamino)ethanol $H_2NCH_2CH_2—NH—CH_2CH_2OH$, 2-amino-2-(hydroxymethyl)-1,3-propanediol,

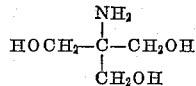

Suitable diamines include aliphatic diamines of the general formula $H_2N(CH_2)_nNH_2$, monosecondary diamines of the general formula $R''NH(CH_2)_nNH_2$, and disecondary diamines of the general formula $R''NH(CH_2)_nNHR''$, where $n$ equals 2 to 10 and where $R''$ is alkyl, aryl, aralkyl or cycloalkyl; aromatic diamines, like meta-phenylenediamine, para-phenylenediamine, toluene-2,4-diamine, toluene-2,6-diamine, 1,5-naphthalenediamine, 1,8 - naphthalenediamine, meta-xylylenediamine, para-xylylenediamine, benzidine, 3,3'-dimethyl-4,4'-biphenyldiamine, 3,3'-dimethoxy-4,4'-biphenyldiamine, 3,3'-dichloro-4,4' - biphenyldiamine, 4,4'-methylenedianiline, 4,4'-ethylenedianiline, 2,3,5,6-tetramethyl-para-phenylenediamine, 2,5 - fluorenediamine, and 2,7-fluorenediamine; cycloaliphatic diamines like 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis-(3-aminopropyl)piperazine.

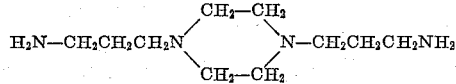

Higher functional polyamines typical of those suitable for use in the method of the invention are: diethylenetriamine, triethylenetetramine, tetraethylenepentamine, dipropylenetriamine, tripropylenetetramine, tetrapropylenepentamine, 1,2,5-benzenetriamine, toluene-2,4,6-triamine, and 4,4',4''-methylidynetrianiline

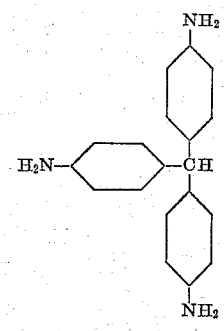

and polyamines obtained by interaction of aromatic monoamines with formaldehyde or other aldehydes, for example:

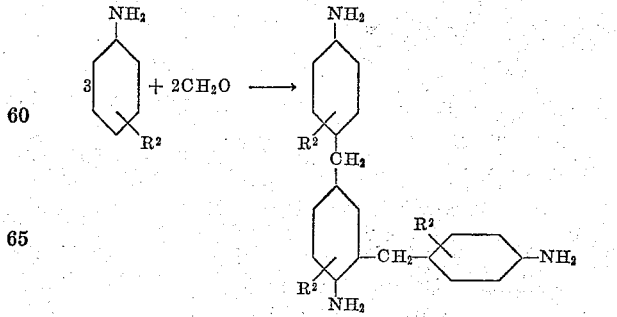

and other reaction products of the above general type, where $R^2$ is H or alkyl.

Lactones will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula:

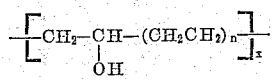

Other vinyl polymers that are suitable include polyvinyl alcohol, copolymers obtainable by copolymerization of a vinyl monomer such as ethylene with other vinylmonomers containing primary or secondary hydroxyl or amino groups or other groups containing reactive hydrogen atoms. Among the vinyl monomers from which such copolymers may, for example, be obtained are: ortho-, meta-, or para-aminostyrene,

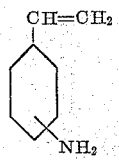

3-butene-1,2-diol $CH_2=CH-CHOH-CH_2OH$, allyl alcohol, methallyl alcohol, 3-phenyl-3-butene-1-ol,

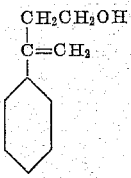

and vinyl ethers like diethylene glycol monovinyl ether $CH_2=CH-OCH_2CH_2OCH_2CH_2OH$.

Representatives of the many polycarboxylic acids that are suitable as polyfunctional initiators in the method of the invention are such dicarboxylic acids as oxalic acid, succinic acid, maleic acid, glutaric acid, adipic acid, pimelic acid, suberic acid, azelaic acid, sebacic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, 1,5-naphthoic acid, 2,7-naphthoic acid, 2,6-naphthoic acid, 3,3'-methylenedibenzoic acid,

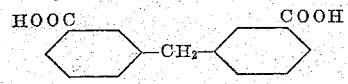

4,4'-(ethylenedioxy)dibenzoic acid,

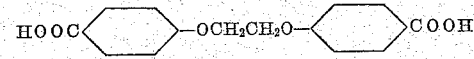

4,4'-biphenyl-dicarboxylic acid,

4,4'-sulfonyldibenzoic acid,

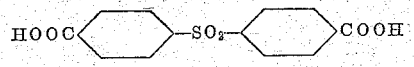

4,4'-oxydibenzoic acid,

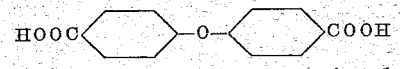

various tetrahydrophthalic acids, and various hexahydrophthalic acids, as well as higher functional acids such as tricarballylic acid, aconitic acid, citric acid, hemimellitic acid, trimellitic acid, trimesic acid, pyromellitic acid, 1,2,3,4-butanetetracarboxylic acid.

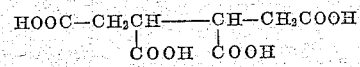

Suitable hydroxy- and aminocarboxylic acids include 2-hydroxypropionic acid, 6-hydroxycaproic acid, 11-hydroxy-undecanoic acid, salicylic acid, para-hydroxybenzoic acid, beta-alanine, 6-aminocaproic acid, 7-aminoheptanoic acid, 11-amino-undecanoic acid, and para-aminobenzoic acid.

The initiator is believed to open the lactone ring to produce an ester or amide having one or more terminal groups that are capable of opening further lactone rings and thereby of adding more and more lactone to the molecule. Thus, for example, the polymerization of epsilon-caprolactone initiated with an amino alcohol is believed to take place primarily as follows:

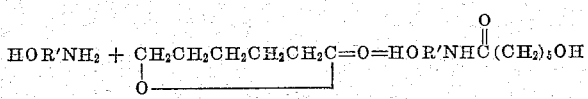

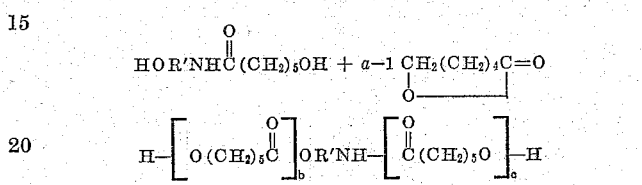

wherein $R'$ in the initiator and in the polyester is an organic radical selected from the group consisting of aliphatic, cycloaliphatic, aromatic and heterocyclic radicals, and $a=b+c$.

Similarly, a monoamine opens and adds a succession of lactone rings as shown in the equation:

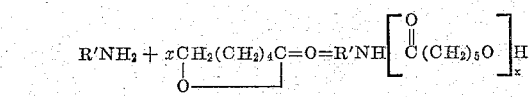

and a dicarboxylic acid, for example, takes part in polymerizing lactones somewhat as follows:

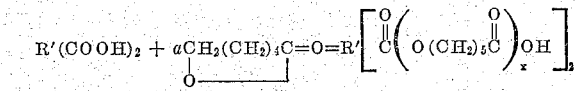

in which the average value of $x$ is $a/2$. It will be apparent from these equations that the lactone polyesters prepared in accordance with this embodiment of the method of the invention can conveniently be represented by the general formula:

$$R'(YL_xZ)_y$$

in which the L's stand for substantially linear groups having the general formula:

wherein $n$ is at least four, at least $n+2R$'s are hydrogen, the remaining R's are substituents selected from the group consisting of hydrogen, alkyl, cycloalkyl, alkoxy and single ring aromatic hydrocarbon radicals, and the total number of carbon atoms in the substituents on a given residue does not exceed about twelve. The subscript $x$ averages at least two and preferably a number large enough to make the total molecular weight of the polyester about 1500 or higher. The number of linear groups in the final polyester will depend in large part upon the molar ratio of lactone to initiator. $R'$ is the organic radical from the initiator and $y$ is a number equal to the functionality of the initiator, i.e., at least 1. The Y's stand for —O—, —NH—, —NR"—, and

R" being a hydrocarbon radical selected from the group consisting of alkyl, aryl, aralkyl and cycloalkyl radicals, and the Z's stand for H or OH, being OH when Y is

but otherwise H. If the polyester is acylated or esterified, as described later, the Z's also stand for alkoxy or acyl radicals, being alkoxy when Y is

but otherwise acyl. It will be understood that when Y is

it will be attached to the oxy group of an "L" group and otherwise it will be linked to the carbonyl of an "L" group.

To initiate and continue the polymerization of the lactone, the lactone and the initiator are preferably heated to a temperature between about 130 and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50 to 300° C. is considered operable and a more limited range between about 130 and 200° C. is considered preferable.

The polymerization may be, and preferably is, carried out with the use of a catalyst, such as a basic or neutral ester interchange catalyst, to accelerate the reaction. Among catalysts suitable for this purpose are such metals as lithium, sodium, potassium, rubidium, caesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

The catalysts that are particularly effective, and therefore preferred, in polymerizing the more difficultly polymerizable lactones such as epsilon-methyl-epsilon-caprolactone and the various dimethyl epsilon-caprolactones without undue discoloration of the polyesters are zinc borate, lead borate, zinc oxide, litharge (lead oxide), and especially organic titanium compounds.

The organic titanium compounds that are especially suitable as catalysts because of their ability to promote the formation of virtually colorless polyesters in a short time are the titanates having the general formulae:

$$X_2TiO_3 \text{ and } X_4TiO_4$$

in which the X's are alkyl, aryl or aralkyl radicals, the alkyl titanates in which the X's are lower alkyl radicals, particularly methyl, ethyl, propyl, isopropyl, butyl, isobutyl, tertiary butyl, amyl, isoamyl, etc., radicals, being preferred. Titanates that deserve special mention because of their efficiency in accelerating the reaction and producing virtually colorless polyesters are tetraisopropyl titanate and tetrabutyl titanate.

The duration of the polymerization varies from about a few minutes to about a week depending upon the lactone or mixtures of lactones selected, the initiator, the reaction temperature and the catalyst, if one is present. If it is desired to obtain a product of superior color, then it is preferable to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120–160° C.

The polyester polymerization products obtained in accordance with the invention have molecular weights generally upwards of about 1500 and preferably within the range of about 1500 to about 7000, although molecular weights below and substantially above this range are obtainable if desired. They also have reactive terminal hydroxyl or carboxyl groups, the number of reactive terminal groups depending upon the functionality of the initiator. They are characterized by the presence of series of interconnected, substantially linear units or groups composed of carbon, hydrogen and oxygen. The interconnected units are opened lactones residues each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected, unless the initiator used was a polycarboxylic acid, to a hydrogen to form a terminal hydroxyl group at one end of the series.

The polyesters having two or more reactive terminal groups (obtained with polyfunctional initiators) are suitable for reaction with isocyanates to form polyurethanes of high molecular weight and superior properties that may be foamed or unfoamed, elastomeric or rigid, as desired, and that are useful as coating materials. The elastomeric products are outstanding particularly as to flexibility at low temperatures and ability to be stored for indefinite periods of time without premature hardening, especially when prepared from copolyesters of two or more lactones. In addition, the polyesters of the invention, including those having one reactive terminal group, are eminently suitable as plasticizers in various resins, e.g., vinyl chloride-vinyl acetate resins, natural rubber, GRS rubber, copolymers of acrylonitrile with ethylenically unsaturated compounds such as butadiene, polyvinyl butyral and polyvinyl chloride, particularly if the polyesters are esterified in known manner to insolubilize the terminal hydroxyl or carboxyl groups and thus improve their resistance to extraction by water from resins with which they are combined.

As plasticizers, the polylactones of the invention have the unique advantage, hitherto so elusive in the development of plasticizers, of combining excellent low temperature performance, i.e., imparting good flexibility to resins even at temperatures below zero, with low volatility and high resistance to water and oil extraction. They are available as easily-pourable liquids, and are therefore susceptible to facile handling and mixing as compared with the highly viscous, non-pourable plasticizers heretofore available. At the same time, the plasticizers of the invention are non-toxic and light-stable.

The preparation of polyesters in accordance with the method of this invention has a number of outstanding advantages. One that is unique and of utmost importance to the use of the polyesters as intermediates in the preparation of polyurethanes is that with th eparticular catalysts employed, and without catalysts, the polyesters are formed with reactive end groups that are not blocked to any significant extent by ester groups, chlorine, or the like. Another very important advantage is that no water of condensation is formed and that consequently the need for drying prior to reaction with a diisocyanate is obviated. In addition, the method of the invention has the advantage of permitting accurate control over the average molecular weight of the polyester, and further of promoting the formation of a substantially homogeneous polyester in which the molecular weights of the individual molecules are substantially all very close to the average molecular weight. This control is obtained by preselecting the molar proportions of lactone and initiator in a manner that will readily be appreciated by those skilled in the art. Thus, for example, if it is desired to form a polyester in which the average molecular weight is approximately twenty times the molecular weight of the initial lactone or lactone mixture, then the proportions of lactone or lactone mixture to iniator untilized in the polymerization are fixed at approximately 20:1 inasmuch as it is to be expected that on the average each molecule of initiator will add on an approximately equal number of lactones and an average of twenty lactone molecules would be available to each molecule of initiator.

A convenient method of measuring the molecular weight of the polyester is to determine the average number of carboxyl and hydroxyl groups in a given amount of the polyester. The acid number (milligrams of KOH per gram of polyester using phenolphthalein as an indictaor) is a measure of the number of terminal carboxyl groups in a polyester. The hydroxyl number, which is a measure of the number of terminal hydroxyl groups and is defined in terms of milligrams of KOH per gram of polyester, is determined by adding pyridine and acetic anhydride to the polyester and titrating the acetic acid formed with KOH as described in Ind. Eng. Chem., Anal. Ed., vol. 16, pages 541–9, and in Ind. Eng. Chem., Anal. Ed., vol 17, page 394. The sum of the acid or carboxyl number and the hydroxyl number, referred to as the reactive number, is an indication of the average number of terminal groups present in the polyester and therefore is in turn an indication of the number of molecules in the mass and the degree of polymerization. A polyester containing long chain molecules will have a relatively low reactive number while a polyester containing short chain molecules will possess a relatively high reactive number.

If the polyesters are intended for use as intermediates in the preparation of polyurethane elastomers, foams or coating materials, we prefer to utilize a mixture of substituted and unsubstituted lactones and polyfunctional initiator containing no carboxylic acid groups. The relative proportions of lactone to initiator should be such as to produce polyesters having a carbonyl number as low as possible and certainly no greater than ten and a hydroxyl number between about forty and about sixty so that the average molecular weight of the polyester will be in the range of about 1900 to 2800. This range of molecular weights is preferred because it yields linearly extended polyester-polyurethane diisocyanate chains of optimum length and promotes the eventual formation of an elastomer having optimum properties of low brittle temperature, tensile strength and non-hardening qualities. It is to be understood, however, that substantial departures can be made from this range of molecular weights, i.e., to as low as about 300 (corresponding to hydroxyl number of 374) if more rigid properties are desired and to as high as 5000 and even 7000 (corresponding to a hydroxyl number of 16) if greater elasticity is more important than high tensile strength.

If the polyesters are intended for use as intermediates in the preparation of foamed polyurethane elastomers, polyfunctional initiators containing carboxylic acid groups, preferably polycarboxylic acids, may be used in proportions, relative to the lactones, to yield polyesters having terminal carboxylic acid groups and a molecular weight ranging between about 500 and about 9000.

When the polyesters are to be used as plasticizers, the initiator may be monofunctional or polyfunctional and the identity of the functional groups of the initiator is not particularly critical. The molecular weight may range between about 1500 and about 9000, although with reactive vinyl polymers as initiators, molecular weights can easily go as high as 20,000 and higher. Optimum plasticizing characteristics, particularly lower viscosity and least discoloration, are obtained with polyesters having molecular weights between about 2000 and about 4000 and which are derived from monomethyl substituted lactones and mixtures thereof with unsubstituted lactones initiated with glycols. While the lactone polyesters are most attractive as plasticizers, particularly for vinyl resins, they can readily be made even more attractive by acylation or esterification of their reactive terminal group to reduce water extractability. Terminal carboxylic acid groups can be esterified in known manner by reaction with higher boiling alcohols, e.g. 2-ethyl-1-butanol, 1-hexanol, 2-ethyl-1-hexanol, 3-heptanol, 2-butyl-1-octanol, 2,6,8-trimethyl-4-nonanol, 5-ethyl-2-nonanol, 7-ethyl-2-methyl-4-undecanol, 3,9-diethyl-6-tridecanol, ethylene glycol monobutyl ether, diethylene glycol monoethyl ether, diethylene glycol monoethyl ether, and diethylene glycol monobutyl ether. Terminal hydroxyl groups are readily esterified by reaction with such acids as acetic and ethyl hexanoic acid, and preferably their anhydrides.

The advantages and utility of the method of the invention and of the products obtained thereby will become further apparent from the following detailed examples included to illustrate the best modes presently contemplated for carrying out the invention. The hydroxyl and carboxyl numbers referred to in the examples were obtained by the method described in Ind. Eng. Chem., Anal. Ed., vol. 17, page 394 (1945).

*Example 1*

193 grams of epsilon-caprolactone and 7.5 grams of 3-aminopropanol were heated at 240–260° C. under a stream of nitrogen for twenty-four hours. The resulting polymer was a wax-like solid. The molecular weight determinations in boiling toluene gave values of about 1630.

*Example 2*

179 grams of epsilon-caprolactone and 21.2 grams of p,p'-bibenzyldiamine were heated as in Example 1. The resulting polymer was a wax-like solid. The molecular weight determinations in boiling toluene gave values of about 2870.

*Example 3*

184 grams of epsilon-caprolactone and 16 grams of pimelic acid were heated at 240–280° C. for thirty-two hours. The resulting polymer was a wax-like solid. Titration of the carboxyl end groups showed the polymer to have a molecular weight of 1550.

*Example 4*

221 grams of gamma-methyl-epsilon-caprolactone and 7.1 grams of ethylene glycol were heated with 0.005 gram of potassium carbonate at 150–180° C. under a stream of nitrogen for forty-eight hours. The resulting polymer was a slightly yellow colored viscous liquid having a hydroxyl number of 54.1 and a carboxyl number of 0.1.

*Example 5*

100 grams of a mixture (obtained from isophorone) of beta,beta',delta - trimethyl - epsilon - caprolactone and beta,delta,delta'-trimethyl-epsilon-caprolactone and 3.2 grams of ethylene glycol were heated with 0.1 gram of sodium at 180° C. under a stream of nitrogen for thirty-six hours. The product was then subjected to stripping at a temperature of 108–160° C. under a vacuum of 3 mm. mercury. The polymer was a viscous liquid having a hydroxyl number of 69.

*Example 6*

100 grams of the lactone mixture of Example 5, 57 grams of epsilon-caprolactone and 3.9 grams of ethylene glycol were heated with 0.07 gram of tetrabutyl titanate at 170° C. under nitrogen for five hours. The resulting product was a reddish-brown liquid having a hydroxyl number of 47.2, a carboxyl number of 0.95 and a molecular weight of 2280.

Example 7

100 grams of the lactone mixture of Example 5 and 3.2 grams of ethylene glycol were heated with 0.1 gram of antimony trioxide to 175–180° C. under nitrogen for seventy-two hours. The product was stripped at 120–160° C. under a vacuum of 3 mm. mercury. The polymer was a brown viscous liquid having a hydroxyl number of 60.4.

Example 8

140 grams of a mixture of beta-methyl-, gamma-methyl-, and delta-methyl-epsilon-caprolactones and 3.7 grams of ethylene glycol were heated with 0.01 gram of calcium to 170–180° C. under nitrogen for eighty-six hours. The resulting polymer was a yellow viscous liquid having a hydroxyl number of 49.8 and a carboxyl number of 1.0.

Example 9

200 grams of epsilon-caprolactone and 6.2 grams of ethylene glycol were heated at 170° C. under nitrogen for forty hours. The resulting polymer was a solid, waxlike material having a hydroxyl number of 54.4 and a carboxyl number of 1.0.

In the following examples, initiators, lactones and catalysts, of varying amounts and identities, were mixed and heated to a controlled temperature of 170° C. while a slow stream of nitrogen was passed through the mixture to exclude air and moisture, thus preventing discoloration of the polyester from oxygen. The polymerization was followed by refractive index measurements at 30° C., the reaction being regarded as complete as soon as the index became constant. The particular catalysts, the amounts used, the polymerization time and the hydroxyl and carboxyl number and color of the polyester products are noted.

Example 10

| | |
|---|---|
| Lactone | 85 g. alpha- and epsilon-methyl-epsilon-caprolactones, and 245 g. beta-, gamma- and delta-methyl-epsilon-caprolactones. |
| Initiator | 9.15 g. ethylene glycol. |
| Catalyst | 0.20 g. calcium methoxide. |
| Reaction time | 20 hours. |
| Hydroxyl number | 47.2. |
| Carboxyl number | 1.9. |
| Viscosity | Low. |
| Color | Yellow. |

Example 11

| | |
|---|---|
| Lactone | 120 g. epsilon-caprolactone and 120 g. beta-, gamma- and delta-methyl-epsilon caprolactone. |
| Initiator | 90 g. polyethylene glycol (average molecular weight: 600). |
| Catalyst | 0.20 g. zinc borate. |
| Reaction time | 3.0 hours. |
| Hydroxyl number | 47.5. |
| Carboxyl number | 1.4. |
| Viscosity | Low. |
| Color | Yellow. |

Example 12

| | |
|---|---|
| Lactone | 100 g. epsilon-caprolactone and 250 g. beta-, gamma- and delta-methyl-epsilon-caprolactones. |
| Initiator | 85 g. polypropylene glycol (average molecular weight: 425). |
| Catalyst | 0.10 g. tetraisopropyl titanate. |
| Reaction time | 1.0 hour. |
| Hydroxyl number | 51.4. |
| Carboxyl number | 0.6. |
| Viscosity | Low. |
| Color | Yellow. |

Example 13

| | |
|---|---|
| Lactone | 80 g. alpha- and epsilon-methyl-epsilon caprolactones and 160 g. beta-, gamma- and delta-methyl-epsilon-caprolactones. |
| Initiator | 205 g. polypropylene glycol (average molecular weight: 1025). |
| Catalyst | 0.10 g. tetrabutyl titanate. |
| Reaction time | 6.0 hours. |
| Hydroxyl number | 51.6. |
| Carboxyl number | 0.6. |
| Color | Yellow. |

Example 14

| | |
|---|---|
| Lactone | 30 g. epsilon-caprolactone and 70 g. beta-, gamma- and delta-methyl-epsilon-caprolactones. |
| Initiator | 4.6 g. p-xylene-alpha-alpha'-diol. |
| Catalyst | 0.05 g. litharge. |
| Reaction time | 2.0 hours. |
| Hydroxyl number | 33.5. |
| Carboxyl number | 1.1. |
| Color | Light brown. |

Example 15

| | |
|---|---|
| Lactone | 539 g. epsilon-caprolactone and 602 g. beta- and delta-methyl-epsilon-caprolactones. |
| Initiator | 31 g. ethylene glycol. |
| Catalyst | 0.55 g. calcium methoxide. |
| Reaction time | 24 hours. |
| Hydroxyl number | 48.4. |
| Carboxyl number | 0.3. |
| Molecular weight | 2280. |
| Color | Yellow. |

Example 16

| | |
|---|---|
| Lactone | 100 g. beta- and delta-methyl-epsilon-caprolactones. |
| Initiator | 3.40 g. N-methylethanolamine. |
| Catalyst | 0.05 g. tetraisopropyl titanate. |
| Reaction time | 1.25 hours. |
| Hydroxyl number | 46.7. |
| Carboxyl number | 0.7. |
| Viscosity | Low. |
| Color | Light brown. |

Example 17

| | |
|---|---|
| Lactone | 100 g. beta- and delta-methyl-epsilon-caprolactones. |
| Initiator | 7.9 g. 4,4'-methylenedianiline. |
| Catalyst | 0.05 g. litharge. |
| Reaction time | 16 hours. |
| Hydroxyl number | 40.1. |
| Carboxyl number | 1.0. |
| Viscosity | High. |
| Color | Light brown. |

Example 18

| | |
|---|---|
| Lactone | 50 g. epsilon-caprolactone and 50 g. beta- and delta-methyl-epsilon-caprolactones. |
| Initiator | 6.1 g. benzidine. |
| Catalyst | 0.05 g. zinc borate. |
| Reaction time | 4 hours. |
| Hydroxyl number | 30.6. |
| Carboxyl number | 1.3. |
| Viscosity | ——. |
| Color | Brown, waxy solid. |

Example 19

| | |
|---|---|
| Lactone | 90 g. alpha- and epsilon-methyl-epsilon-caprolactones and 260 g. beta-, gamma- and delta-methyl-epsilon-caprolactones. |
| Initiator | 7.85 g. 1,2,6-hexanetriol. |
| Catalyst | 0.075 g. tetrabutyl titanate. |
| Reaction time | 20 hours. |
| Hydroxyl number | 24.4. |
| Carboxyl number | 0.6. |
| Viscosity | Medium. |
| Color | Yellow. |

Example 20

| | |
|---|---|
| Lactone | 350 g. beta- and delta-methyl-epsilon caprolactones. |
| Initiator | 11.1 g. dipentaerythritol. |
| Catalyst | 0.10 g. zinc borate. |
| Reaction time | 17 hours. |
| Hydroxyl number | 38.2. |
| Carboxyl number | 1.4. |
| Viscosity | Medium. |
| Color | Light yellow. |

Example 21

| | |
|---|---|
| Lactone | 100 g. beta- and delta-methyl-epsilon-caprolactones. |
| Initiator | 3.0 g. N,N,N',N'-tetrakis (2-hydroxypropyl) ethylenediamine. |
| Catalyst | 0.03 g. tetrabutyl titanate. |
| Reaction time | 17 hours. |
| Hydroxyl number | 19.9. |
| Carboxyl number | 1.0. |
| Viscosity | High. |
| Color | Light brown. |

Example 22

| | |
|---|---|
| Lactone | 100 g. alpha- and epsilon-methyl-epsilon-caprolactones and 250 g. beta-, gamma- and delta-methyl-epsilon-caprolactones. |
| Initiator | 12.0 g. diethylenetriamine. |
| Catalyst | 0.10 g. tetrabutyl titanate. |
| Reaction time | 4 hours. |
| Hydroxyl number | 50.4. |
| Carboxyl number | 2.6. |
| Viscosity | Medium. |
| Color | Yellow. |

Example 23

| | |
|---|---|
| Lactone | 100 g. beta- and delta-methyl-epsilon-caprolactones. |
| Initiator | 2.0 g. tetraethylenepentamine. |
| Catalyst | 0.05 g. zinc borate. |
| Reaction time | 18 hours. |
| Hydroxyl number | 23.3. |
| Carboxyl number | 2.6. |
| Viscosity | High. |
| Color | Brown. |

Example 24

| | |
|---|---|
| Lactone | 400 g. mixture of dimethyl-, ethyl-, trimethyl-, methylethyl- and propyl-caprolactones (prepared from a xylenol fraction boiling at 224–229° C.). |
| Initiator | 8.45 g. ethylene glycol. |
| Catalyst | 0.2 g. tetrabutyl titanate. |
| Reaction time | 22.5 hours. |
| Hydroxyl number | 36.4. |
| Carboxyl number | 1.9. |
| Viscosity | Medium. |
| Color | Reddish brown. |

Example 25

| | |
|---|---|
| Lactone | 400 g. gamma-methyl-epsilon caprolactone. |
| Initiator | 8.3 g. ethylene glycol. |
| Catalyst | None. |
| Reaction time | 72 hours. |
| Hydroxyl number | 37.3. |
| Carboxyl number | 0.3. |
| Molecular weight | 2950. |
| Color | Yellow. |

Example 26

| | |
|---|---|
| Lactone | 150 g. mixture of alpha-, beta-, gamma-, delta- and epsilon-methyl-epsilon-caprolactones (prepared from o-, m- and p-cresols) and 150 g. epsilon-caprolactone. |
| Initiator | 11.6 g. aniline. |
| Catalyst | 0.15 g. tetraisopropyl titanate. |
| Reaction time | 18.5 hours. |
| Hydroxyl number | 22. |
| Carboxyl number | 0.3. |
| Molecular weight | 2480. |
| Color | Pale brown. |

Example 27

| | |
|---|---|
| Lactone | 150 g. epsilon-caprolactone and 150 g. mixture of dimethyl-epsilon-caprolactones (prepared from a xylenol fraction boiling at 212.5–219° C.). |
| Initiator | 57.6 g. di-2-ethylhexylamine. |
| Catalyst | 0.15 g. litharge. |
| Reaction time | 24 hours. |
| Hydroxyl number | 35.1. |
| Carboxyl number | 1.6. |
| Molecular weight | 1465 |
| Color | Yellow. |

The molecular weight range of the products prepared in accordance with Examples 10 through 27 was from about 2000 to 10,000. The molecular weight of each product is readily calculable from the hydroxyl and carboxyl numbers and the functionality of the polyester by the following formula:

$$M.W. = \frac{\text{Functionality} \times 1000 \times 56.1}{\text{Hydroxyl number} + (2 \times \text{carboxyl number})}$$

Molecular weight so calculated is fairly accurate, particularly so long as the carboxyl content is fairly low; i.e. not appreciably greater than about five. This is demonstrated by calculations of molecular weights for the product of Example 21 wherein the calculated molecular weight is:

$$M.W. = \frac{4 \times 1000 \times 56.1}{19.9 + 2 \times 1.0} = 10,250$$

This figure compares with the expected molecular weight, based on the charging ratio of the reactants, of 10,050.

In most of the examples in which a brown color is reported, technical or practical grade initiators were employed, indicating that the brown color is due not to decomposition of the lactones during the polymerization, but from impurities contained in the initiator. Exceptions to this were observed in the use of strongly basic ester interchange catalysts where some decomposition of the lactones probably occurs upon prolonged heating.

Several representative substituted epsilon-caprolactones were polymerized by heating to various temperatures with an amount of ethylene glycol calculated to yield an average molecular weight of 2200 without a catalyst and with representative concentrations of the catalysts indicated in the table below. The catalyst concentrations are in terms of percent by weight of lactone and the procedure in each polymerization was to add the catalysts after the reactants had reached the indicated temperature. The progress of the polymerization was followed, and polymerization time was determined, by means of the refractive index, which becomes constant when polymerization is complete.

| Epsilon-Caprolactone | Catalyst | Catalyst Concentration, percent | Temperature, °C. | Time, hrs. |
|---|---|---|---|---|
| Mixed alpha, and epsilon-methyl. | None | | 170 | 102 |
| Do | Tetrabutyl titanate | 0.1 | 170 | 1.75 |
| Do | do | 0.05 | 170 | 1.75 |
| Do | do | 0.01 | 170 | 2 |
| Do | do | 0.1 | 150 | 2.75 |
| Do | do | 0.05 | 150 | 5.25 |
| Do | do | 0.01 | 150 | 7.75 |
| Do | do | 0.1 | 130 | 7.75 |
| Do | do | 0.05 | 130 | 19 |
| Do | do | 0.01 | 130 | 16 |
| Beta, delta-dimethyl | None | | 170 | 102 |
| Do | Tetraisopropyl titanate | 0.05 | 170 | 0.5 |
| Gamma-methyl | None | | 170 | 70 |
| Do | Tetraisopropyl titanate | 0.05 | 170 | 0.25 |
| Mixed beta- and delta-methyl. | None | | 170 | 29 |
| Do | Tetraisopropyl titanate | 0.05 | 170 | 0.5 |
| Mixed alpha- and epsilon-methyl. | Zinc borate | 0.1 | 170 | 7.75 |
| Do | do | 0.05 | 170 | 10 |
| Do | do | 0.01 | 170 | 19 |
| Do | do | 0.05 | 150 | 23.5 |
| Do | do | 0.05 | 130 | 47 |
| Beta, delta-dimethyl | do | 0.05 | 170 | 3.75 |
| Gamma-methyl | do | 0.05 | 170 | 2 |
| Mixed beta- and delta-methyl. | do | 0.05 | 170 | 3.75 |
| Mixed alpha- and epsilon-methyl. | Litharge | 0.1 | 170 | 7.25 |
| Do | do | 0.05 | 170 | 10 |
| Do | do | 0.01 | 170 | 19 |
| Do | do | 0.05 | 150 | 40 |
| Do | do | 0.05 | 130 | 59 |
| Do | Lead borate | 0.1 | 170 | 10.5 |
| Beta, delta-dimethyl | Litharge | 0.05 | 130 | 1.25 |
| Gamma-methyl | do | 0.05 | 170 | 1.75 |
| Mixed beta- and delta-methyl. | do | 0.05 | 170 | 1.25 |
| Mixed alpha- and epsilon-methyl. | Aluminum isopropoxide. | 0.1 | 170 | 46 |

The data in this table illustrates the remarkable efficacy of the preferred catalysts in accelerating the polymerization of the more difficultly polymerizable lactones.

While in accordance with the embodiments of the invention emphasized in foregoing descriptions and examples the lactone rings are opened and connected directly to one another, it is also within the scope of the invention to form lactone polyesters in which the lactone residues need not necessarily be connected directly to one another. This is readily accomplished, for example, by reacting mixtures of lactones with combinations of initiators such as dibasic acids and glycols, diamines and amino alcohols. This type of reaction and the type of polyester produced thereby may be illustrated by the reaction of one mol of adipic acid, one mol of gamma-methyl-epsilon-caprolactone and slightly more than one mol of ethylene glycol which results in a hydroxyl terminated polyester having the general formula:

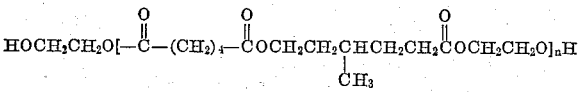

in which the acid, lactone, and glycol residues are in random distribution and not necessarily as specifically illustrated. The variations in structure and in distribution that are obtainable by this means can readily be appreciated in view of the fact that the lactone is capable of reacting with both the acid and the glycol.

Polyesters produced in accordance with this embodiment of the invention are also suitable as plasticizers, particularly if the reactive end groups are esterified, as intermediates in the preparation of polyurethane resins and coating compositions. It is preferable to utilize a slight excess of glycols, diamines or amino alcohols over the molar amount of dicarboxylic acid employed in order to achieve a polyester having predominantly terminal hydroxyl or amino groups and to remove the water of condensation formed by the reaction of the dibasic acid with the hydroxyl or amino groups of the glycols, diamines or amino alcohols. Optimum plasticizing properties are obtainable with esterified polyesters having molecular weights between about 2000 and 4000 and prepared with monomethyl lactones and mixtures of monomethyl and unsubstituted lactones. The best modes now contemplated of practicing this embodiment of the invention will become apparent from the following additional examples:

*Example 28*

730 grams of adipic acid, 570 grams of epsilon-caprolactone and 357 grams of ethylene glycol were heated to 160° C. under nitrogen until the water of condensation ceased to distill over. The reactants were then maintained at an increased temperature of 180–190° C. for an additional seventy-two hours. The mixture was thereupon subjected to a vacuum of 3 mm. for six hours at 120° C. A pale brown, viscous polyester having a hydroxyl number of 40 and a carboxyl number of 1.4 was obtained.

*Example 29*

636 grams of a mixture of 13 parts glutaric acid to 37 parts glutaric anhydride, 570 grams of epsilon-caprolactone and 357 grams of ethylene glycol were heated under nitrogen to 160° C. until the water of condensation ceased to distill over. The reactants were then kept at 180° C. for an additional sixty hours and then subjected to a vacuum of 3 mm. for three hours at the same temperature. The resulting polyester was a yellow, viscous liquid having a hydroxyl number of 46 and a carboxyl number of 2.7.

*Example 30*

584 grams of adipic acid, 512 grams of a mixture of beta-, gamma-, and delta-methyl-epsilon-caprolactones and 298 grams of ethylene glycol were heated to 160° C. under nitrogen until the water of condensation ceased to distill off. The reactants were then kept at an increased temperature of 180° C. for an additional twenty-four hours and then subjected to a vacuum of 20 mm. for 3.5 hours at 180–200° C. to remove a small excess of ethylene glycol. The resulting polymer was a water-clear viscous liquid having a hydroxyl number of 49.5 and a carboxyl number of 1.9.

*Example 31*

592 grams of phthalic anhydride, 456 grams of epsilon-caprolactone and 298 grams of ethylene glycol were heated to 160° C. under nitrogen until the water of condensation ceased to distill off. The reactants were then kept at the same temperature for another twenty-four hours and then subjected to a vacuum of 20 mm. for 3.5 hours, still at the same temperature. The resulting polymer was a very viscous, yellow liquid having a hydroxyl number of 48.6 and a carboxyl number of 1.2.

*Example 32*

664 grams of isophthalic acid, 456 grams of epsilon-caprolactone and 318 grams of ethylene glycol were heated to 180° C. under nitrogen for six days. The reactants were then subjected to a vacuum of 20 mm. for four hours while the temperature was increased to 200° C. The resulting polyester was a rubbery, semi-solid material, having a hydroxyl number of 45.9 and a carboxyl number of 0.3.

The polyesters of Examples 15, 20, 22, 24, 25, 26 and 30 were acetylated by reacting them for four to five hours at 100° C. with four times the amount of acetic anhydride theoretically required on the basis of their hydroxyl contents. Excess acetic anhydride and acetic acid were then removed under vacuum. Finally, the acetylated polyesters were passed over a falling film evaporator at 170–180° C. under a vacuum of 1–5 mm. to remove remaining small quantities of volatile materials.

The remaining products were then tested as plasticizers by milling for five minutes at 158° C. on a laboratory two-roll mill with a 96:4 vinyl chloride-vinyl acetate copolymer and 0.5% dibutyltin maleate stabilizer. The resulting clear, flexible sheets were molded at 158° C. to form specimens suitable for testing.

In the table immediately following, effectiveness is the concentration of plasticizer based on the total weight of resin plus plasticizer producing an elastomer having an elongation of 100% at 24.5° C. under a load of 1000 p.s.i. (applied at a constant rate in 74 seconds); the elongation is the increase in length at rupture with the sample at 24.5° C.; flex temperature ($T_F$) and ($T_4$) are indicative of pliability and are points corresponding to a stiffness modulus of 135,000 p.s.i. and 10,000 p.s.i., respectively, on a temperature-stiffness curve, the stiffness measurements being determined on a Clash and Berg Torsional Stiffness Tester as outlined in ASTM Method D1043–51 (Ind. Eng. Chem., 34, 1218, 1942); the brittle temperature is a measure of flexibility at low temperature and is determined by an impact test as defined in ASTM Method D746–52T; the percent water and oil extraction is the percentage weight loss of four mil films immersed in distilled water and in refined mineral oil, respectively, for a period of ten days at 25° C.; the Durometer "A" hardness is a measure of resistance to indentation of an 0.25 inch specimen by a pin equipped with a truncated cone point as described in ASTM Method D676–49T; the SPI volatility is the percent weight loss of four to six mil films after contact with activated carbon granules for twenty-four hours at 70° C., as described in ASTM Method D1203–52T; and the "sweat-out" is a measure of exudation of the plasticizer on aging two weeks at room temperature. The values below "effectiveness" in the table are based on resin containing the "effective" percentage of plasticizer.

| Example No. | 15 | 20 | 22 | 24 | 25 | 26 | 30 |
|---|---|---|---|---|---|---|---|
| Molecular Weight | 2,350 | 7,900 | 3,100 | 2,900 | 3,000 | 2,525 | 2,100 |
| Viscosity, cps. at 20° C | 4,780 | 41,600 | 20,920 | 37,760 | 7,790 | 18,800 | 10,940 |
| Viscosity, cps. at 50° C | 1,020 | 5,480 | 2,584 | 2,368 | 1,432 | 5,170 | 1,848 |
| Effectiveness, Percent | 39.9 | 40.9 | 44.4 | 45.6 | 41.0 | 43.2 | 42.6 |
| Tensile Strength, p.s.i | 2,390 | 2,280 | 2,100 | 2,150 | 2,420 | 2,360 | 2,350 |
| Elongation, Percent | 360 | 345 | 345 | 340 | 350 | 365 | 345 |
| ASTM Stiffness Modulus, p.s.i | 600 | 825 | 600 | 570 | 600 | 725 | 700 |
| $T_F$, °C | −17 | −16 | −13 | −14 | −19 | −14 | −21 |
| $T_4$, °C | 0 | 5 | 1 | 3 | −1 | 2 | −3 |
| Brittle Temperature, °C | −20 | −21 | −18 | −12 | −22 | −22 | −24 |
| Percent Extraction: | | | | | | | |
| Oil | 0.8 | 0.1 | nil | 3.2 | 0.8 | 0.3 | 1.0 |
| Water | 0.2 | 0.1 | 0.5 | 0.2 | 0.1 | 0.5 | 1.5 |
| Shore Hardness "A" | 63 | 65 | 58 | 60 | 66 | 60 | 61 |
| SPI Volatile Loss | 0.3 | 0.2 | 0.1 | 0.4 | 0.5 | 0.4 | 0.4 |
| Sweat-out | None | None | None | None | None | None | None |

*Example 33*

Epsilon-caprolactone (646 grams), 1,2,4-butanetriol (104 grams), and potassium carbonate catalyst (0.08 gram) were heated at 170° C. in a slow stream of nitrogen for 46 hours. The resulting polymer was a viscous liquid, having a hydroxyl number of 201 and a carboxyl number of 0.6.

*Example 34*

Epsilon-caprolactone (887 grams), 1,2,6-hexanetriol (13.4 grams), and potassium carbonate catalyst (0.09 gram) were heated at 165–175° C. for 52 hours, while a slow stream of nitrogen was passed through the reaction mixture. The resulting polymer was a waxy solid, having a hydroxyl number of 16.4 and a carboxyl number of 1.8.

*Example 35*

Epsilon-caprolactone (2692 grams), 1,2,6-hexanetriol (682 grams), and potassium carbonate catalyst (0.32 gram) were heated at 170° C. for 26 hours, while a slow stream of nitrogen was passed through the reactants. The resulting polymer was a viscous liquid, having a hydroxyl number of 195 and a carboxyl number of 1.6.

*Example 36*

Epsilon-caprolactone (1366 grams), 1,2,6-hexanetriol (134 grams), and potassium carbonate catalyst (0.15 gram) were heated at 170° C. for 46 hours in a slow stream of nitrogen. The resulting polymer was a waxy solid, having a hydroxyl number of 103 and a carboxyl number of 0.6.

*Example 37*

Epsilon-caprolactone (1002 grams), and triethanolamine (298 grams) were heated at 170° C. for 24 hours, in a slow stream of nitrogen. The resulting polymer was a viscous liquid, having a hydroxyl number of 198 and a carboxyl number of 6.1.

In a further embodiment of the invention there are produced, as indicated previously, novel linearly extended polyester-polyurethane diisocyanate polymers. The novel lactone polyesters which are terminated with hydroxyl groups at each end of the linear chain can be reacted with a molar excess of the various and well known organic diisocyanates to yield a linearly extended polyester-polyurethane polymer, the linear chain of which is terminated at both ends with an isocyanate group (—NCO). Thus, for instance, it is readily appreciated by those skilled in the art that the reaction of a hydroxyl group (—OH) with an isocyanate group (—NCO) results in the formation of a urethane group, i.e.,

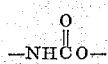

In order to linearly extend the novel hydroxyl-terminated lactone polyester diols to obtain a novel diisocyanate terminated polymer, it is readily apparent that a molar excess of diisocyanate to said lactone polyester diol is employed. Moreover, the reaction involving two or more mols of diisocyanate per mol of said lactone polyester diol merely results, on the average, in the addition of one molecule of diisocyanate per hydroxyl group of said lactone polyester diol. As indicated previously, the novel lactone polyesters are composed of individual molecules whose molecular weights are substantially all very close to the average molecular weight. This unexpected advantage carries over into the novel linearly extended polyester-polyurethane diisocyanate polymers.

Those skilled in the art are quite aware of the organic diisocyanates which can be used to linearly extend the polymer chain of the lactone polyester diols. Illustrative of such organic diisocyanates are, for example, m- and p-phenylene diisocyanates, 2,4- and 2,6-tolylene diisocyanates, 4,4'-biphenylene diisocyanate, 3,3'-dimethyl-44,' - biphenylene diisocyanate, 3,3'-dimethoxy-4,4'-biphenylene diisocyanate, p,p'-bibenzyl diisocyanate, p,p'-diphenylmethane diisocyanate, 4,4'-methylene bis(ortho-tolyl isocyanate), 1,5-naphthalene diisocyanate, etc. The publication of Siefken (Annalen, 562, pages 122–135 (1949)), lists numerous other diisocyanates which are useful for performing this reaction.

In the following examples, the examination of the isocyanate-terminated polyurethane-polyester products was conducted at room temperature, i.e., about 23° C.

*Example 38*

221 grams of gamma-methyl-epsilon-caprolactone were heated with 7.1 grams ethylene glycol under nitrogen and in the presence of 0.005 gram potassium carbonate for forty-eight hours at 150–180° C. After this time, no monomer could be recovered. The resulting polyester was a slightly yellow, viscous liquid having a hydroxyl number of 54.1, a carboxyl number of 0.1 and a molecular weight of 2075.

100 grams of this polyester was heated to 130–150° C. with 18.1 grams of p,p'-diphenylmethane diisocyanate, and the resulting admixture was maintained thereat for a period of 30 minutes. There was obtained a viscous liquid isocyanate-terminated polyurethane polyester product.

*Example 39*

120 grams of unsubstituted epsilon-caprolactone and 80 grams of a mixture of beta, gamma-, and delta-methyl-epsilon-caprolactones were copolymerized with 6.4 grams of ethylene glycol in the presence of 0.02 gram calcium by heating to 180° C. under nitrogen for eighty-six hours. After this time, no monomers could be recovered under vacuum. The resulting polyester was a slightly yellow colored, viscous liquid having a hydroxyl number of 58.1 and a carboxyl number of 1.0.

115 grams of this polyester were reacted with 22.3 grams of p,p'-diphenylmethane diisocyanate at 130–150° C., and the resulting admixture was maintained thereat for a period of 30 minutes. There was obtained a viscous liquid isocyanate-terminated polyurethane polyester product.

*Example 40*

A copolyester was prepared by heating 500 grams of a mixture of alpha-, beta-, gamma-, delta-, and epsilon-methyl-epsilon-caprolactones (obtained from a mixture of ortho-, meta-, and para-cresols) with 14.5 grams ethylene glycol in the presence of 0.25 gram dibutyltin oxide at 170° C. under nitrogen for four hours. The resulting copolyester was a slightly yellow, viscous liquid having a hydroxyl number of 43.7, a carboxyl number of 2.3 and a molecular weight of about 2320.

300 grams of this copolyester were reacted at 130–140° C. with 54 grams of 3,3'-dimethyl-4,4'-biphenylene diisocyanate, and the resulting admixture was maintained thereat for a period of 30 minutes. There was obtained a viscous liquid isocyanate-terminated polyurethane polyester product.

*Example 41*

A copolyester was prepared by heating 216 grams epsilon-caprolactone and 139 grams of a mixture of di-methyl-epsilon-caprolactones (obtained from a xylenol fraction boiling at 212.5–219° C.) with 11.6 grams ethylene glycol in the presence of 0.2 gram dibutyltin oxide at 170° C. under nitrogen for nineteen hours. The resulting copolyester was a yollew, viscous liquid having a hydroxyl number of 48.3, a carboxyl number of 1.9 and a molecular weight of about 2190.

300 grams of this copolyester were reacted with 55.3 grams 3,3'-dimethyl-4,4'-biphenylene diisocyanate at 130–140° C., and the resulting admixture was maintained thereat for a period of 30 minutes. There was obtained a viscous liquid isocyanate-terminated polyurethane polyester product.

*Example 42*

100 grams of epsilon-caprolactone and 4.3 grams of tetramethylene glycol were heated under nitrogen for forty-eight hours at 180° C. in the presence of 0.01 gram potassium carbonate as catalyst. Thereafter a vacuum of a few millimeters mercury was applied, but no monomer could be recovered. The resulting solid polyester had a hydroxyl number of 62.3 and an estimated molecular weight of approximately 1800. This polyester (97 grams) was reacted at 120–140° C. for ten minutes with 20.3 grams of p,p'-diphenylmethane diisocyanate. After a period of one hour, there is obtained a solid isocyanate-terminated polyurethane polyester product.

*Example 43*

200 grams of epsilon-caprolactone were heated with 6.2 grams ethylene glycol under nitrogen for forty hours at 170° C. After this time, no monomer could be recovered. The resulting polyester was a solid, wax-like material having a hydroxyl number of 54.4, a carboxyl number of 1.0 and a molecular weight of approximately 2000. This polyester (181 grams) was heated to 120–145° C. with 33 grams of p,p'-diphenylmethane diisocyanate. After a period of one hour, there is obtained a solid isocyanate-terminated polyurethane polyester product.

*Example 44*

One mol of diethylene glycol was heated with eight mols of epsilon-caprolactone in the presence of 0.3 gram of tetrabutyltitanate under nitrogen at 170° C. for six hours. The resulting polyester was a solid, wax-like material having a hydroxyl number of 112 and a molecular weight of about 1000. This polyester (500 grams) was heated with 174 grams of an 80:20 mixture of 2,4- and 2,6-tolylene diisocyanates at 90° C., for a period of 30 minutes. Upon cooling to room temperature, the resulting isocyanate-terminated product solidifies.

*Example 45*

(A) 304 grams (4 mols) of propylene glycol, 438 grams (3 mols) of adipic acid, 1000 milliliters of benzene and 0.2 gram of tetraisopropyl titanate catalyst are charged to a reaction flask equipped with stirrer, thermometer, and azeotropic head. The reactants are heated to reflux and over a period of 8 hours about 105 grams of water are removed by means of the azeotropic head. The benzene is then removed by distillation and the reaction mixture is subjected to a vacuum of 10 mm. of Hg at 100°–120° C. for a period of two hours to remove a small amount of water of condensation. The resulting viscous liquid product has a hydroxyl value of 177.

(B) 630 grams of the above product is copolymerized with 1710 grams of epsilon-caprolactone by heating at 160°–170° C. for a period of 8 hours under an atmosphere of nitrogen. The resulting randomized copolyester is a viscous liquid having a hydroxyl value of 47.8.

(C) 1170 grams (0.5 mol) of the above copolyester is reacted with 250 grams of 4,4'-diphenylmethane diisocyanate by heating the reactants at 80° C. for a period of two hours. The resulting isocyanate-terminated polymer has an —NCO content of 2.9 percent as determined by the conventional dibutylamine analysis for the isocyanate group.

With reference to Example 45 above, in lieu of propylene glycol there can be employed various polyhydric alcohols such as the alkanediols; the alkanetriols; the alkanetetrols; the alkanepentols; the alkanehexols; the cycloalkanediols; the cycloalkanetriols; the cycloalkanetetrols; the cycloalkanepentols; the cycloalkanehexols; the poly(alkylene glycols) and the polyoxyalkylene glycols, for example, diethylene glycol, dipropylene glycol, poly(ethylene glycol), poly(propylene glycol), dibutylene glycol, poly(butylene glycol), the polyoxyethyleneoxypropylene glycols, the polyoxyethyleneoxybutylene glycols, the polyoxypropyleneoxybutylene glycols, and the like; the glycosides, for example, the alkyl glycosides, sucrose, the acetals of monohydric alcohols and disaccharides or higher oligosaccharides; the vicinal-epoxyalkane adducts, e.g., ethylene oxide, propylene oxide, butylene oxide, etc., of the above; the polyhydroxyl initiators illustrated previously; the polyols illustrated in U.S. 2,935,488 which are incorporated by reference into this disclosure; the vicinal-epoxyalkane adducts, e.g., ethylene oxide, propylene oxide, butylene oxide, etc., of the polyhydric phenols which phenols are illustrated in U.S. 2,935,488 and which are incorporated by reference into this disclosure; mixtures of the above; and the like.

With further reference to Example 45 above, in lieu of adipic acid there can be employed various polycarboxylic acids and/or their anhydrides such as the aliphatic, aromatic, and cycloaliphatic polycarboxylic acids, preferably dicarboxylic acids, e.g., succinic acid, glutaric acid, adipic acid, pimelic acid, suberic acid, azelaic acid, sebacic acid, alkylsuccinic acids, alkylglutaric acids, 1,2,4-hexanetricarboxylic acid, 1,1,5-pentanetricarboxylic acid, 1,2,4-benzenetricarboxylic acid, 1,2,3,4-benzenetetracarboxylic acid, phthalic acid, terephthalic acid, isophthalic acid, chlorendic acid, chlorendic anhydride, glutaric anhydride, adipic anhydride, succinic anhydride, naphthalic anhydride, phthalic anhydride, hexahydrophthalic anhydride, and the like; the dimer acids, the polycarboxylic acids, and the polycarboxy polyesters such as those illustrated in U.S. 2,935,488 and which are incorporated by reference into this disclosure; the polycarboxylic acid anhydrides such as those illustrated in U.S. 2,918,444 and which are incorporated by reference into this disclosure; the polycarboxyl initiators illustrated previously; mixtures of the above, and the like. Acids such as the oxalic and the malonic acids which decarboxylate are not contemplated in this useful invention which is illustrated by Example 45 supra.

The ratio of polyhydric alcohol to polycarboxylic acid and/or anhydride will depend upon whether one desires to prepare hydroxyl-terminated polyesters or carboxyl-terminated polyesters. To prepare hydroxyl-terminated polyesters, one employs the polyhydric alcohol and the polycarboxylic acid (and/or their anhydrides) in such relative amounts so as to provide more than one hydroxyl group (equivalent) of the polyhydric alcohol per carboxyl group (equivalent) of the polycarboxylic acid (and/or their anhydrides). It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride. In general, desirable hydroxyl-terminated substantially linear polyesters are obtained by employing a dihydric alcohol and a dicarboxylic acid (and/or their anhydrides) in such relative amounts so as to provide from about 1.2 to about 2 hydroxyl groups of the dihydric alcohol per carboxyl group of the dicarboxylic acid and/or anhydride, and preferably from about 1.4 to about 1.8 hydroxyl groups per carboxyl group. In similar fashion, to prepare carboxyl-terminated polyesters one employs the polycarboxylic acid (and/or their anhydride) and the polyhydric alcohol in such relative amounts so as to provide more than 1.0 carboxyl group of the acid and/or anhydride per hydroxyl group of the polyhydric alcohol. For desirable carboxyl-terminated polyesters one employs the acid and alcohol in such relative amounts so as to provide from about 1.2 to 2 carboxyl groups of the acid and/or anhydride per hydroxyl group of the alcohol.

With further reference to the embodiment illustrated by Example 45 above, the aforesaid hydroxyl-terminated polyesters or carboxyl-terminated polyesters can be reacted with a lactone or mixture of lactones such as those illustrated previously to thus yield valuable hydroxyl-terminated or carboxyl-terminated polyester products. In general, a molar excess of lactone with relation to the polyester is employed so that the average molecular weights of the resulting polyester products are in the range of from about 500 to about 20,000. It is preferred, however, that at least two mols of lactone per mol of hydroxyl-terminated or carboxyl-terminated polyester be employed so that the resulting novel polymeric products have an average molecular weight of from about 600 to 5000 and preferably 800 to 3500.

The aforesaid novel polymeric products, especially the hydroxy-terminated polyesters, can be linearly extended by reacting same with a molar excess of an organic diisocyanate to thus produce diisocyanate-terminated polyester polyurethane polymers. The organic diisocyanates which are contemplated include those which have been illustrated previously. It is desirable to employ the aforesaid novel hydroxyl-terminated polyesters and organic diisocyanates in such relative amounts so as to provide from about 1.2 to about 2 isocyanato groups of the organic diisocyanates per hydroxyl group of the hydroxyl-terminated polyester, and preferably from about 1.3 to about 2.

*Example 46*

(A) 106 grams of diethylene glycol (1 mol), 684 grams of epsilon-caprolactone (6 mols), 384 grams of mixed methyl-epsilon-caprolactones (3 mols), and 0.05 gram of tetrabutyl titanate are heated at 160°–170° C. under an atmosphere of nitrogen for a period of 8 hours. The resulting copolymer is a liquid product having a molecular weight of about 1170 and a hydroxyl number of about 104.5.

(B) 585 grams of the above the lactone copolyester diol are reacted with 58 grams of an 80:20 mixture (by weight) of 2,4- and 2,6-toluene diisocyanates at 90° C. under an atmosphere of nitrogen for a period of 2 hours. The resulting hydroxyl-terminated liquid product has a hydroxyl number of 28.9.

*Example 47*

(A) 106 grams of diethylene glycol (one mol) and 798 grams of epsilon-caprolactone are polymerized in the presence of 0.05 gram of tetrabutyl titanate by heating to 160–170° C. for eight hours. The resulting polyesters upon cooling to room temperature is a solid product having a hydroxyl number of 124 and a molecular weight of about 900.

(B) 450 grams of the above caprolactone polyester diol are reacted with 58 grams of an 80:20 mixture (by weight) of 2,4- and 2,6-toluene diisocyanate at 100° C. under nitrogen atmosphere for a period of 2 hours. The resulting hydroxyl-terminated product solidifies upon cooling to room temperature. The product has a hydroxyl number of 36.8.

It is apparent that various modifications will readily occur to those skilled in the art upon reading this description. All such modifications are intended to be included within the scope of the invention as defined in the accompanying claims.

What is claimed is:

1. A process which comprises heating a lactone of the formula:

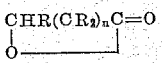

wherein $n$ is an integer of from four to six, wherein at least $n + 2R$'s are hydrogen, and wherein the remaining R's are of the groups consisting of hydrogen, alkyl, cycloalkyl, alkoxy, and single ring aromatic hydrocarbon radicals; with an organic functional initiator having at least one reactive hydrogen substituent and being of the group consisting of alcohols, amines, polyols, polyamines, amino alcohols, polycarboxylic acids, hydroxycarboxylic acids, and aminocarboxylic acids; to a temperature of at least about 50° C.; said lactone being in molar excess with relation to said organic functional initiator to produce a product having at least two substantially linear groups, per reactive hydrogen substituent of said initiator, of the formula

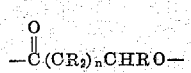

wherein the variables $n$ and $R$ have the aforesaid meanings, said product having an average molecular weight of at least about 300.

2. The process of claim 1 wherein said organic functional initiator contains one reactive hydrogen substituent.

3. A process which comprises heating a lactone of the formula:

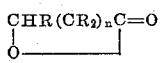

wherein *n* is an integer of from four to six, wherein at least *n* + 2R's are hydrogen, and wherein the remaining R's are of the groups consisting of hydrogen, alkyl, cycloalkyl, alkoxy, and single ring aromatic hydrocarbon radicals; with an organic functional initiator having at least one reactive hydrogen substituent and being of the group consisting of alcohols, amines, polyols, polyamines, amino alcohols, polycarboxylic acids, hydroxycarboxylic acids, and aminocarboxylic acids; to a temperature in the range of from about 50° to 300° C.; said lactone being in molar excess with relation to said organic functional initiator to produce a product having at least two substantially linear groups, per reactive hydrogen substituent of said initiator, of the formula

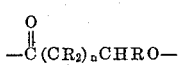

wherein the variables *n* and R have the aforesaid meanings.

4. A process which comprises heating a lactone of the formula

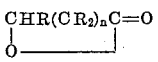

wherein *n* is an integer of from four to six, wherein at least *n* + 2R's are hydrogen, and wherein the remaining R's are of the group consisting of hydrogen, alkyl, cycloalkyl, alkoxy, and single ring aromatic hydrocarbon radicals; with an organic polyfunctional initiator having at least two reactive hydrogen substituents capable of opening the lactone ring; to a temperature in the range of from about 50° to 300° C.; said lactone being in molar excess with relation to said organic polyfunctional initiator to produce a product having at least two substantially linear groups, per reactive hydrogen substituent of said initiator of the formula

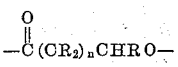

wherein the variables *n* and R have the aforesaid meanings.

5. The process of claim 4 wherein said product has an average molecular weight of from about 300 to 7000 and a hydroxyl number of from 374 to 16.

6. The process of claim 4 wherein said product has an average molecular weight upwards of about 1500.

7. A process which comprises heating epsilon-caprolactone with a polyol to a temperature in the range of from about 50° to 300° C., said epsilon-caprolactone being in molar excess with relation to said polyol to produce a hydroxyl-terminated polyester having at least two substantially linear groups, per hydroxyl group of said polyol, each of said linear groups having a terminal oxy group at one end, a carbonyl group at the other end, and an intermediate chain of five methylene groups.

8. A process which comprises heating an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a polyol; to a temperature in the range of from about 50° to 300° C.; said admixture of epsilon-caprolactones being in molar excess with relation to said polyol to produce a hydroxyl-terminated copolyester having at least two substantially linear groups, per hydroxyl group of said polyol, each of said linear groups having a terminal oxy group at one end, a carbonyl group at the other end, and an intermediate chain of five carbon atoms; said hydroxyl-terminated copolyester having an average molecular weight of from about 300 to 7000 and a hydroxyl number of from 374 to 16.

9. The process of claim 7 wherein said polyol is a diol.

10. The process of claim 8 wherein said polyol is a diol.

11. The process of claim 9 wherein said diol is diethylene glycol.

12. The process of claim 10 wherein said diol is diethylene glycol.

13. A process which comprises heating epsilon-caprolactone with a polyamine which has at least one reactive hydrogen substituent on each of at least two reactive amino groups, to a temperature in the range of from about 50° to 300° C., said epsilon-caprolactone being in molar excess with relation to said polyamine to produce a hydroxyl-terminated product having at least two substantially linear groups, per reactive amino group of said polyamine, each of said linear groups having a terminal oxy group at one end, a carbonyl group at the other end, and an intermediate chain of five methylene groups.

14. A process which comprises heating an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a polyamine which has at least one reactive hydrogen substituent on each of at least two reactive amino groups; to a temperature in the range of from about 50° to 300° C.; said admixture of epsilon-caprolactones being in molar excess with relation to said polyamine to produce a hydroxyl-terminated product having at least two substantially linear groups, per reactive amino group of said polyamine, each of said linear groups having a terminal oxy group at one end, a carbonyl group at the other end, and an intermediate chain of five carbon atoms; said hydroxyl terminated product having an average molecular weight of from about 300 to 7000 and a hydroxyl number of from 374 to 16.

15. A process which comprises heating epsilon-caprolactone with an amino alcohol to a temperature in the range of from about 50° to 300° C., said epsilon-caprolactone being in molar excess with relation to said amino alcohol to produce a hydroxyl terminated product having at least two substantially linear groups, per reactive hydrogen substituent of said amino alcohol, each of said linear groups having a terminal oxy group at one end, a carbonyl group at the other end, and an intermediate chain of five methylene groups.

16. A process which comprises heating an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with an amino alcohol; to a temperature in the range of from about 50° to 300° C.; said admixture of epsilon-caprolactones being in molar excess with relation to said amino alcohol to produce a hydroxyl-terminated product having at least two substantially linear groups, per reactive hydrogen substituent of said amino alcohol, each of said linear groups having a terminal oxy group at one end, a carbonyl group at the other end, and an intermediate chain of five carbon atoms; said hydroxyl-terminated product having an average molecular weight of from about 300 to 7000 and a hydroxyl number of from 374 to 16.

17. A process which comprises heating epsilon-caprolactone with a polycarboxylic acid to a temperature in the range of from about 50° to 300° C., said epsilon-caprolactone being in molar excess with relation to said polycarboxylic acid to produce a carboxyl-terminated polyester having at least two substantially linear groups, per carboxyl group of said polycarboxylic acid, each of said linear groups having a terminal oxy group at one end, a carbonyl group at the other end, and an intermediate chain of five methylene groups, said carboxyl-terminated polyester having an average molecular weight of from about 500 to about 9000.

18. A process which comprises heating an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a polycarboxylic acid; to a temperature in the range of from about 50° to 300° C.; said admixture of epsilon-caprolactones being in molar excess with relation to said polycarboxylic acid to produce a carboxyl-terminated copolyester having at least two substantially linear groups, per carboxyl group of said polycarboxylic acid, each of said linear groups having a terminal oxy group at one end, a carbonyl group at the other end, and an intermediate chain of five carbon atoms; said carboxyl-terminated copolyester having an average molecular weight of from about 500 to about 9000.

19. A process which comprises heating epsilon-caprolactone with a hydroxycarboxylic acid to a temperature in the range of from about 50° to 300° C.; said epsilon-caprolactone being in molar excess with relation to said hydroxycarboxylic acid to produce a polyester having hydroxyl and carboxyl termination, said polyester having at least two substantially linear groups, per reactive hydrogen substituent of said hydroxycarboxylic acid, each of said linear groups having a terminal oxy group at one end, a carbonyl group at the other end, and an intermediate chain of five methylene groups.

20. A process which comprises heating an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atoms which is attached to the oxy group in the substituted lactone ring; with a hydroxycarboxylic acid; to a temperature in the range of from about 50° to 300° C.; siad admixture of epsilon-caprolactones being in excess with relation to said hydroxycarboxylic acid to produce a copolyester having hydroxyl and carboxyl termination, said copolyester having at least two substantially linear groups, per reactive hydrogen substituent of said hydroxycarboxylic acid, each of said linear groups having a terminal oxy group at one end, a carbonyl group at the other end, and an intermediate chain of five carbon atoms.

21. A process which comprises heating (a) an epsilon-caprolactone which has no more than three substituents of the group consisting of hydrogen, alkyl, cycloalkyl, alkoxy, and single ring aromatic hydrogen radicals, none of said substituents having more than 12 carbon atoms, the total number of said carbon atoms in the substituents not exceeding 12, said epsilon-caprolactone having at least one hydrogen substituent on the carbon atom which is attached to the oxy group in the caprolactone ring, with (b) a dicarboxylic acid, and (c) a molar excess, in relation to the amount of dicarboxylic acid, of a member of the group consisting of glycols, diamines, and amino alcohols; to a temperature in the range of from about 50° to 300° C.; to produce a polyester having at least two substantially linear groups therein, each of said linear groups having a terminal oxy group at one end, a carbonyl group at the other end, and an intermediate chain of five carbon atoms which has at least one hydrogen substituent on the carbon atom in said intermediate chain that is attached to said terminal oxy group.

22. A process which comprises heating (a) an epsilon-caprolactone which has no more than three substituents of the group consisting of hydrogen, alkyl, cycloalkyl, alkoxy, and single ring aromatic hydrogen radicals, none of said substituents having more than 12 carbon atoms, the total number of said carbon atoms in the substituents not exceeding 12, said epsilon-caprolactone having at least one hydrogen substituent on the carbon atom which is attached to the oxy group in the caprolactone ring; with (b) an organic functional initiator having at least one reactive hydrogen substituent and being of the group consisting of alcohols, amines, polyols, polyamines, amino alcohols, polycarboxylic acids, hydroxycarboxylic acids, and aminocarboxylic acids; to a temperature in the range of from about 50° to 300° C.; said lactone being in molar excess with relation to said organic functional initiator to produce a polyester having at least two substantially linear groups per reactive hydrogen substituent of said initiator, each of said linear groups having a terminal oxy group at one end, a carbonyl group at the other end, and an intermediate chain of five carbon atoms having at least one hydrogen substituent on the carbon atom in said intermediate chain that is attached to said terminal oxy group; said polyester having at least one reactive terminal group selected from the group consisting of hydroxyl groups, carboxyl groups, and mixtures thereof; said polyester having an average molecular weight upwards fo about 1500; subsequently reacting said polyester with a compound selected from the group consisting of alcohols, aliphatic carboxylic acids, and the anhydrides thereof to thus produce a polyester wherein at least one of said reactive terminal groups is end-blocked.

23. A product formed by the reaction of an admixture containing a lactone of the formula:

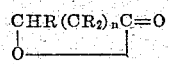

wherein $n$ is an integer of from four to six, wherein at least $n + 2$R's are hydrogen, and wherein the remaining R's are of the group consisting of hydrogen, alkyl, cycloalkyl, alkoxy, and single ring aromatic hydrocarbon radicals; and an organic functional initiator having at least one reactive hydrogen substituent and being of the group consisting of alcohols, amines, polyols, polyamines, amino alcohols, polycarboxylic acids, and aminocarboxylic acids; said lactone being in molar excess with relation to said initiator; said initiator being capable of opening the lactone ring whereby said lactone is added to said initiator as a substantially linear group thereto; said product possessing, on the average, at least two of said linear groups, per reactive hydrogen substituent of said initiator, each of said linear groups having the formula:

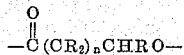

wherein the variables $n$ and R have the aforesaid meanings.

24. The product of claim 23 wherein said product has an average molecular weight of from about 300 to 7000.

25. The product of claim 23 wherein said product has an average molecular weight upwards of about 1500.

26. Hydroxyl-terminated polyesters having an average molecular weight of from about 300 to 7000 and a hydroxyl number of from 374 to 16; said polyesters being formed by the reaction of an admixture containing epsilon-caprolactone and a polyol, said epsilon-caprolactone being in molar excess with relation to said polyol, whereby said epsilon-caprolactone is added to said polyol as a substantially linear group thereto; said polyesters possessing, on the average, at least two of said linear groups, per hydroxyl group of said polyol, each of said linear groups having a terminal oxy group at one end, a carbonyl group at the other end, and an intermediate chain of five methylene groups.

27. Hydroxyl-terminated copolyesters having an average molecular weight of from about 300 to 7000 and a hydroxyl number of from 374 to 16; said copolyesters being formed by the reaction of an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a polyol; the aforesaid lactone admixture being in molar excess with relation to said polyol, whereby the aforesaid lactones are added to said polyol as substantially linear groups thereto; said copolyester possessing, on the average, at least two of said linear groups, per hydroxyl group of said polyol, each of said linear groups having a terminal oxy group at one end, a carbonyl group at the other end, and an intermediate chain of five carbon atoms.

28. The product of claim 26 wherein said polyol is diethylene glycol.

29. The product of claim 27 wherein said polyol is diethylene glycol.

30. Hydroxyl-terminated products having an average molecular weight of from about 300 to 7000 and a hydroxyl number of from 374 to 16; said products being formed by the reaction of an admixture containing epsilon-caprolactone and a polyamine which has at least one reactive hydrogen substituent on each of at least two reactive amino groups contained in said polyamine, said epsilon-caprolactone being in molar excess with relation to said polyamine, whereby said epsilon-caprolactone is added to said polyamine as a substantially linear group thereto; said products possessing, on the average, at least two of said linear groups, per reactive amino group of said polyamine, each of said linear groups having a terminal oxy group at one end, a carbonyl group at the other end, and an intermediate chain of five methylene groups.

31. Hydroxyl-terminated products having an average molecular weight of from about 300 to 7000 and a hydroxyl number of from 374 to 16; said products being formed by the reaction of an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a polyamine which has at least one reactive hydrogen substituent on each of at least two reactive amino groups contained in said polyamine; the aforesaid lactone admixture being in molar excess with relation to said polyamine, whereby the aforesaid lactones are added to said polyamine as substantially linear groups thereto; said products possessing, on the average, at least two of said linear groups, per reactive amino group of said polyamine, each of said linear groups having a terminal oxy group at one end, a carbonyl group at the other end, and an intermediate chain of five carbon atoms.

32. Hydroxyl-terminated products having an average molecular weight of from about 300 to 7000 and a hydroxyl number of from 374 to 16; said products being formed by the reaction of an admixture containing epsilon-caprolactone and an amino alcohol, said epsilon-caprolactone being in molar excess with relation to said amino alcohol, whereby said epsilon-caprolactone is added to said amino alcohol as a substantially linear group thereto; said products possessing, on the average, at least two of said linear groups, per reactive hydrogen substituent of said amino alcohol, each of said linear groups having a terminal oxy group at one end, a carbonyl group at the other end, and an intermediate chain of five methylene groups.

33. Hydroxyl-terminated products having an average molecular weight of from about 300 to 7000 and a hydroxyl number of from 374 to 16; said products being formed by the reaction of an admixture containing epsilon-caprolactone and a substituted epsilon-caprolactone, said substituted epsilon-caprolactone have up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with an amino alcohol; the aforesaid lactone admixture being in molar excess with relation to said amino alcohol, whereby the aforesaid lactones are added to said amino alcohol as substantially linear groups thereto; said products possessing, on the average, at least two of said linear groups, per reactive hydrogen substituent of said amino alcohol, each of said linear groups having a terminal oxy group at one end, a carbonyl group at the other end, and an intermediate chain of five carbon atoms.

34. Carboxyl-terminated polyesters having an average molecular weight of from about 500 to about 9000; said polyesters being formed by the reaction of an admixture containing epsilon-caprolactone and a polycarboxylic acid, said epsilon-caprolactone being in molar excess with relation to said polycarboxylic acid, whereby said epsilon-caprolactone is added to said polycarboxylic acid as a substantially linear group thereto; said polyesters possessing, on the average, at least two of said linear groups, per carboxyl group of said polycarboxylic acid, each of said linear groups having a terminal oxy group at one end, a carbonyl group at the other end, and an intermediate chain of five methylene groups.

35. Carboxyl-terminated copolyesters having an average molecular weight of from about 500 to about 9000; said copolyesters being formed by the reaction of an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a polycarboxylic acid; the aforesaid lactone admixture being in molar excess with relation to said polycarboxylic acid, whereby the aforesaid lactones are added to said polycarboxylic acid as substantially linear groups thereto; said copolyesters possessing, on the average, at least two of said linear groups, per carboxyl group of said polycarboxylic acid, each of said linear groups having a terminal oxy group at one end, a carbonyl group at the other end, and an intermediate chain of five carbon atoms.

36. Copolyesters having hydroxyl and carboxyl termination and having an average molecular weight of from about 300 to 7000; said copolyesters being formed by the reaction of an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a hydroxycarboxylic acid; the aforesaid lactone admixture being in molar excess with relation to said hydroxycarboxylic acid, whereby the aforesaid lactones are added to said hydroxycarboxylic acid as substantially linear groups thereto; said copolyesters possessing, on the average, at least two of said linear groups, per reactive hydrogen substituent of said hydroxycarboxylic acid, each of said linear groups having a terminal oxy group at one end, a carbonyl group at the other end, and an intermediate chain of five carbon atoms.

37. A product prepared as defined in claim 21.
38. A product prepared as defined in claim 22.

References Cited by the Examiner

UNITED STATES PATENTS

| | | | |
|---|---|---|---|
| 2,361,036 | 10/44 | Kung | 260—78.3 |
| 2,776,951 | 1/57 | Melamed | 260—78.3 |
| 2,817,646 | 12/57 | Payne | 260—78.3 |

FOREIGN PATENTS

| | | |
|---|---|---|
| 745,312 | 3/44 | Germany. |
| 861,609 | 1/53 | Germany. |

JOSEPH L. SCHOFER, *Primary Examiner.*

DONALD E. CZAJA, *Examiner.*

Disclaimer 3,169,945.—*Fritz Hostettler*, Charleston, W. Va., and *Donald M. Young*, New York, N.Y. LACTONE POLYESTERS. Patent dated Feb. 16, 1965. Disclaimer filed Feb. 15, 1965, by the inventors; the assignee, *Union Carbide Corporation* assenting.

Hereby enter this disclaimer to the terminal portion of said patent subsequent to Mar. 22, 1977.

[*Official Gazette June 1, 1965.*]